United States Patent [19]

Wear

[11] 3,962,190
[45] June 8, 1976

[54] CHAIN COUPLERS FOR POLYESTERIFICATION AND NOVEL POLYESTERS

[75] Inventor: Robert L. Wear, West St. Paul, Minn.

[73] Assignee: Minnesota Mining and Manufacturing Company, St. Paul, Minn.

[22] Filed: Mar. 7, 1974

[21] Appl. No.: 449,012

[52] U.S. Cl. .............................. 260/75 R; 260/75 M
[51] Int. Cl.² ......................................... C08G 63/20
[58] Field of Search ........................ 260/75 R, 75 M

[56] References Cited
UNITED STATES PATENTS

| | | | |
|---|---|---|---|
| 3,433,770 | 3/1969 | Shima et al. | 260/75 R |
| 3,444,141 | 5/1969 | Shima et al. | 260/75 R |
| 3,714,125 | 1/1973 | Shima et al. | 260/75 M |

OTHER PUBLICATIONS

Dunbar et al., *J. Polymer Sci.*, 21, 550–551 (1956).
Inoue et al., *Chemical Abstracts*, vol. 78: 98,983f (1973).
Montecatini Edison, *Chemical Abstracts*, vol. 78: 148,876n (1973).

*Primary Examiner*—Murray Tillman
*Assistant Examiner*—W. C. Danison, Jr.
*Attorney, Agent, or Firm*—Alexander, Sell, Steldt & DeLaHunt

[57] ABSTRACT

Addition of polycarboxylic chain coupling compounds of the formula:

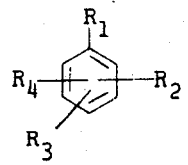

to a polyesterification reaction mixture of at least one polyol and at least one polycarboxylic compound (other than the polycarboxylic chain coupling compound) after polyesterification has begun increases the polymerization rate and does not diminish physical properties of the polyester.

11 Claims, No Drawings

CHAIN COUPLERS FOR POLYESTERIFICATION AND NOVEL POLYESTERS

The generally accepted method of preparing polyester materials with film or fiber forming capabilities is to form a polymerization monomer (a diester) by reacting a dicarboxylic compound (e.g., a dibasic acid or its lower aliphatic ester) with a dihydric alcohol or its functional derivatives, most preferably with a stoichiometric excess of the alcohol. This monomer is then caused to undergo condensation polymerization by heating in the presence of a catalyst. Residual dihydric alcohol is removed from the system during this step by vacuum distillation.

Until recently, this reaction was limited in the extent to which it would proceed, for the polymerization system could "top-out", or reach a point where further polymerization would not take place, even though the polymer may not have as high a molecular weight as desired. The intrinsic viscosity of the polymer would rarely surpass about 0.8 even with extremely long reaction times.

The apparent rate of polycondensation reactions for polyesters (e.g., polyethylene terephthalate) is dependent upon the elimination of liberated by-products since the reaction is essentially an equilibrium reaction. For example, in the polycondensation of polyethylene terephthalate, the reaction is $$-C_6H_4COOCH_2CH_2OH + HOCH_2CH_2OOCC_6H_4- \rightleftharpoons -C_6H_4COOCH_2CH_2OOCC_6H_4- + HOCH_2CH_2OH$$

During the early stages of polycondensation, the diol product can diffuse through the system readily. But as the reaction proceeds, the viscosity increases markedly, reducing the ability of the diol to be removed from the system, even under vacuum. Also side reactions occur which result in the formation of carboxylic groups, aldehydes, etc., thus limiting the molecular weight attainable. Because of this "topping out", it is very difficult to produce high molecular weight polyesters having intrinsic viscosities of greater than 0.8.

It has previously been found that the reaction mechanism and hence the inhibiting reaction equilibrium can be changed by using specific diesters in the reaction mixture (*Polymer Preprints*, Vol. 13, No. 1, pp. 578–583, (1972)). Subsequent experimentation with these diester additives has shown that the resultant polyesters, although exhibiting some improved characteristics over previous polyesters, do not polymerize at a substantially increased rate.

One aspect of this invention concerns the use of novel chain-coupling agents for polyesterification reactions which will overcome some of the problems attendant upon other chain-coupling agents.

It is another aspect of this invention to use novel chain-coupling agents in forming high molecular weight polyesters, at a rapid rate of polymerization.

It is a further aspect of this invention to produce novel polyesters containing therein the residue of the chain-coupling agents of this invention.

It has been found in this invention that certain polyphenylcarboxylate substituted phenyls significantly increase the rate of polyester formation when added to a polyesterification reaction mixture as a chain-coupler without diminishing extrudability (or workability) and physical properties.

The compounds of this invention may be represented by the formula:

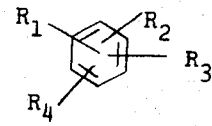

wherein $R_1$, $R_2$, $R_3$ and $R_4$ are hydrogen or a carboxylate group selected from a phenylcarboxylate group or a bis(phenoxy carbonyl) phenyl ketone or sulfone group, with at least three of $R_1$–$R_4$ being a phenyl carboxylate or a bis(phenoxy carbonyl) phenyl ketone or sulfone with at most one of either the bis(phenoxy carbonyl) phenyl ketone or the sulfone in the polycarboxylic compound and each said carboxylate group having at most one adjacent carboxylate group. Phenyl carboxylate is the group

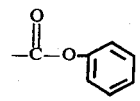

bis(phenoxy carbonyl) phenyl ketone is the group

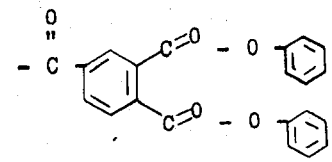

and bis(phenoxy carbonyl) phenyl sulfone is the group

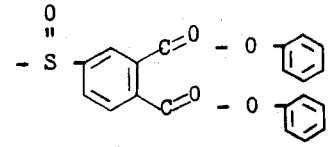

The chain coupling compounds of this invention would therefore include (1,2,4), (1,2,5), (1,2,4,5) and (1,3,5) tri- or tetra- phenyl carboxylates, while excluding (1,2,3) tri- phenyl carboxylate and any other compound having more than two adjacent phenyl carboxylate groups. The phenyl carboxylate and bis(phenoxy carbonyl) phenyl ketone groups are preferred to the bis(phenoxy carbonyl) phenyl sulfone group in the practice of this invention. Difunctional acidic compounds and dihydric alcohols are preferred, but compounds with more than two functional groups may be used.

When added to the reaction mixture of a polyesterification process, e.g., for forming polyethylene terephthalate, the couplers of this invention will become part of the skeletal chain. In the case of triphenyl trimesate,

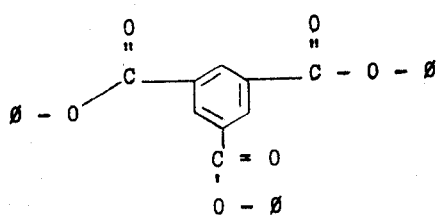

the polymer chain would include linkages such as:

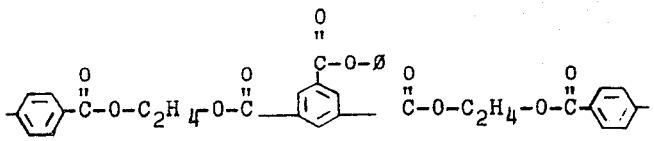

or a similar linkage wherein the above chain coupling residue

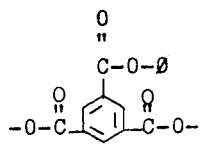

is further reacted so that the remaining phenylcarboxylate group reacts forming a three-dimensional structure.

The chain coupling compounds of this invention may be prepared from the corresponding acids. The acids are reacted with phosphorous pentachloride in trichlorobenzene, or with thionyl chloride to form the acid chlorides. These are then reacted with phenol in pyridine to form the final crude esters which are purified by recrystallization A further understanding of the present invention may be obtained from the following examples.

EXAMPLE I

Preparation of Triphenyl Trimellitate 42 grams of commercially available trimellitic acid was mixed with 138 g. of $PCl_5$ in 100 ml. trichlorobenzene. An exothermic reaction was observed. After completion of the reaction, most of the trichlorobenzene was removed by vacuum distillation. The remaining crude acid chloride was added dropwise with stirring to 65 grams of phenol in about 145 ml. of pyridine. The solution was stirred and cooled with an ice bath during the 10 minute addition period, and then stirred one hour without cooling. The mixture was then heated to 60°C. After being allowed to cool to room temperature, the mixture was poured onto ice having 170 ml. of concentrated HCl therein. An offwhite crystalline solid formed. This was collected by filtration, washed with 5–6 portions of water, and air dried. This product (triphenyl trimellitate) weighed 81 grams. Trichlorobenzene was still detectable in the product; it was therefore recrystallized from 275 ml. methyl ethyl ketone. The white, very fine, fibrous crystals were filtered and washed with two portions of cold methyl ethyl ketone. After air-drying overnight, the final yield of triphenyl trimellitate was 49.5 grams (M.p. 156.5°–157.5°C.)

EXAMPLE II

Preparation of Tri-o-isopropylphenyl Trimesate 40 grams of commercially available tri-acid chloride derivative of trimesic acid was poured slowly into a solution of 68 grams of 2-o-isopropyl phenol (also commercially available) in 155 ml. of pyridine. The reaction and product isolation was carried out as described in the previous example. The tri-o-isopropylphenyl trimesate was recrystallized from a mixture of methyl ethyl ketone and heptane to give 52 g., (M.p. 127°–130°C).

EXAMPLE III

Preparation of Tetraphenyl 3,4,3',4'-Benzophenone Tetracarboxylate

61 Grams 3,4,3',4' benzophenone tetracarboxylic acid was converted to the acid chloride by refluxing the acid with 200 ml. thionyl chloride and 3 ml. of dimethyl formamide for 6 ½ hours. The reaction mixture was distilled at 10 mm. pressure until the distillation residue reached a temperature of 100°C. This residue of crude acid chloride derivative was reacted with 70 g. of phenol in 250 ml. of pyridine as described in the previous example, to yield the tetraphenyl 3,4,3',4'-benzophenone tetracarboxylate. The product was twice recrystallized from methyl ethyl ketone — ethyl alcohol mixture to give 48 g., M.p. 138°–139.5°C.

EXAMPLES IV – XIII

The effects of the chain couplers of this invention on the polymerization of polyethylene terephthalate were examined in the following manner:

A one gallon polymerization vessel was used to mix and polymerize the reaction mixtures. In each run, 8 moles of dimethyl terephthalate (1552 grams), 17.6 moles of ethylene glycol (1092 grams or 1 liter), and a catalyst system of 0.388 g. Zinc acetate . $2H_2O$ and 0.388 g. $Sb_2O_3$ were used as the standard reaction mixture to which the chain couplers were added.

To measure the intrinsic viscosity readily during the rapid polymerization of the reaction mixtures, a stirrer was calibrated to indicate the intrinsic viscosity of the particular reaction mixture used in this example by correlating the power load of the stirrer at measured intrinsic viscosities for the polymerization systems used in this example. By measuring the power load of the stirrer (i.e., amperage required) at a given r.p.m. during the reaction, the intrinsic viscosity may be accurately measured at any given time. The original intrinsic viscosity measurements were made with a Series 75 Cannon-Fenske viscometer. This device is a glass U-tube designed to give relative viscosity measurements by timing the flow through a fixed length of a capillary of a definite volume of the solution or solvent under test, the temperature of the assembly being maintained in a water bath at 31.5°C ± .05°C. Anhydrous trifluoracetic acid is the solvent, and the polyester polymer concentration used is 0.5 g/100 ml. of solution.

Definitions of various viscosity terms follow:

$$\text{Relative viscosity} = \frac{\text{flow time of solution in seconds}}{\text{flow time of solvent in seconds}}$$

$$\text{Inherent viscosity} = \frac{\log_n \text{ relative viscosity}}{\text{concentration in grams/100 ml of solution}}$$

$$\text{Intrinsic viscosity} = \lim_{C \to 0} \frac{\log_n \text{relative viscosity}}{\text{concentration (C) in grams/100 ml of solution}}$$

In these examples, various chain-coupling agents of this invention and the prior art were added in various amounts to the reaction mixtures described above when an intrinsic viscosity of 0.3 was reached in each run. Reaction temperatures were kept between 280°–285°C. during all runs. The time for the intrinsic viscosity of the reaction mixture to reach 0.6 from 0.3 was measured.

triphenyl trimesate (9.61g) was added to the reaction mixture. The reaction was stopped by allowing the mixture to cool and the intrinsic viscosity was found to be about 0.66.

The polymer was recovered, ground and screened through a No. 10 sieve (10–20 mesh). The particles were used in a solid state polymerization process at 230°–235°C under a forced (1.5 ft³/min.) nitrogen atmosphere. The reaction was continued for 6 hours once 230°C was reached. Upon cooling, the final intrinsic viscosity was measured as about 1.77. The high viscosity is attributable to the chain couplers of the present invention.

| Example | Additive | Phenoxy Eq. Wt. | Wt. % Added | Ratio of Phenoxy Groups to Polymer Hydroxyl Groups* | Polymerization Time (IV=0.3 →0.6) Minutes | % of Control |
| --- | --- | --- | --- | --- | --- | --- |
| IV | None | | | | 25 | — |
| V | Diphenyl terephthalate | 159 | 2.0 | 0.50 | 31 | 124 |
| VI | Diphenyl carbonate | 107 | 1.8 | 0.67 | 35 | 140 |
| VII | Diphenyl carbonate | 107 | 0.5 | 0.19 | 26 | 104 |
| VIII | Triphenyl trimesate | 146 | 20 | 0.55 | 4 | 16 |
| IX | Triphenyl trimesate | 146 | 1.2 | 0.33 | 7 | 28 |
| X | Triphenyl trimellitate | 146 | 2.0 | 0.55 | 9 | 36 |
| XI | Tetraphenyl pyromellitate | 140 | 2.0 | 0.57 | 8 | 32 |
| XII | Tri-o-isopropylphenyl trimesate | 188 | 2.0 | 0.43 | 16 | 64 |
| XIII | Tetraphenyl-3,4,3',4'-benzophenone tetracarboxylate | 165.5 | 2.0 | 0.48 | 10 | 40 |

*Polymer has a hydroxyl equivalent weight of ~4000 at an IV of 0.3.

Although the diphenyl carbonate and diphenyl terephthalate have been indicated by the literature as increasing the rate of polymerization (U.S. Pat. Nos. 3,433,770 and 3,444,141) this was not found to be so under the recited reaction conditions. It can be seen that the triphenyl carboxylates and the tetraphenyl carboxylates were far more active in the polyesterification process than were the prior art diphenyl carbonate or carboxylates.

It is preferred to add the coupling agents of the present invention to the polyesterification reaction mixture after polymerization has been initiated. When the chain coupling compounds of the present invention were added before vacuum or initially into the reaction mixture, the resulting film had inferior tensile and elongation properties. The chain coupling compounds are preferably added after the mixture has reached an intrinxic viscosity of 0.2 and is especially preferred when added at an intrinsic viscosity of about 0.3. The chain couplers of this invention are particularly useful in polyesterification reactions between polyols and polycarboxylic compounds. The polycarboxylic compounds of the polyesterification reaction should be different from the chain coupling compounds of this invention which happen to be polycarboxylic compounds as defined.

EXAMPLE XIV

This example shows the utility of the couplers of the present invention in solid state polymerization processes. Such processes are well known in the art as represented by U.S. Pat. Nos. 3,075,952 and 3,344,091 and British Pat. No. 1,066,162.

A mixture of 1553g dimetylterephthalate and 1092g ethylene glycol was added to a 10 gallon kettle with a catalyst comprising 0.388 g zinc octoate . 2H₂O and 0.388 g Sb₂O₃. The polymerization reaction began, and at an intrinsic viscosity of about 0.3, 0.62% by weight

I claim:
1. In the process comprising forming a polyester by reacting at least one diol with at least one dicarboxylic compound the improvement which comprises adding to a reaction mixture of diol and dicarboxylic compound after polyesterification has begun, a chain coupling compound of the formula:

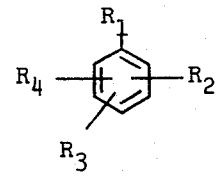

wherein $R_1$, $R_2$, $R_3$ and $R_4$ are hydrogen or a carboxylate group selected from a phenyl carboxylate group, a bis(phenoxy carbonyl) phenyl ketone group, or a bis(phenoxy carbonyl) phenyl sulfone with at least three of $R_1$–$R_4$ being a phenyl carboxylate or a bis(phenoxy carbonyl) phenyl ketone or a bis(phenoxy carbonyl) phenyl sulfone group with at most one of either the ketone or the sulfone group in the chain coupling compound and each said carboxylate group having at most one adjacent carboxylate group.

2. The process of claim 1 wherein the chain coupling compound is added to the reaction mixture after the mixture has reached an intrinsic viscosity of at least about 0.2.

3. The process of claim 1 wherein the diol is ethylene glycol and the polycarboxylic compound is terephthalic acid or dimethyl terephthalate.

4. The process of claim 1 wherein the chain coupling compound is triphenyl trimesate, triphenyl trimellitate, tetraphenyl pyromellitate, or tetraphenyl-3,4,3',4'-benzophenone tetracarboxylate.

5. The process of claim 1 wherein the chain coupling compound is triphenyl trimesate, triphenyl trimellitate, tetraphenyl pyromellitate, or tetraphenyl-3,4,3',4'-benzophenone tetracarboxylate.

6. A polyester material which contains within its polymer chain a residue of a polycarboxylic chain coupling compound of the formula:

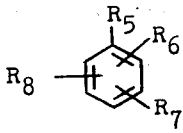

wherein $R_5$, $R_6$, $R_7$ and $R_8$ are hydrogen or a carboxylate group selected from a phenyl carboxylate group, a bis(phenoxy carbonyl) phenyl ketone group, or a bis(phenoxy carbonyl) phenyl sulfone with at least three of $R_5$–$R_8$ being a phenyl carboxylate or a bis(phenoxy carbonyl) phenyl ketone or a bis(phenoxy carbonyl) phenyl sulfone group with at most one of either the ketone or the sulfone group in the polycarboxylic compound and each said carboxylate group having at most one adjacent carboxylate group, said residue having been reacted into the polymer chain by the addition of said chain coupling compound to the reaction mixture comprising at least one diol and at least one dicarboxylic acid after polyesterification has begun.

7. The polyester of claim 6 wherein the chain coupling compound residue is derived from triphenyl trimesage, triphenyl trimellitate, tetraphenyl pyromellitate, or tetraphenyl-3,4,3',4'-benzophenone tetracarboxylate.

8. The polyester of claim 6 wherein the carboxylate group is a phenyl carboxylate.

9. The process of claim 1 wherein the carboxylate group is a phenyl carboxylate.

10. The process of claim 1 wherein after addition of the chain coupling compound solid state polymerization is begun.

11. The polyester of claim 6 wherein the chain coupling compound was added after the intrinsic viscosity of the reaction mixture has reached about 0.3.

* * * * *

UNITED STATES PATENT OFFICE
CERTIFICATE OF CORRECTION

Patent No. 3,962,190  Dated June 8, 1976

Inventor(s) Robert L. Wear

It is certified that error appears in the above-identified patent and that said Letters Patent are hereby corrected as shown below:

Column 4, line 60, "trifluoracetic" should read

-- trifluoroacetic --.

Column 5, Example VIII, "20" should read -- 2.0 --.

Signed and Sealed this

Sixteenth Day of November 1976

[SEAL]

*Attest:*

RUTH C. MASON
*Attesting Officer*

C. MARSHALL DANN
*Commissioner of Patents and Trademarks*